United States Patent
Schwan et al.

[11] Patent Number: 5,892,411
[45] Date of Patent: Apr. 6, 1999

[54] DATA TRANSMISSION DEVICE

[75] Inventors: Ulrich Schwan, Trillenbühlstrasse 29, D-88682 Salem-Beuren; Andreas Nagel, Halver, both of Germany

[73] Assignee: Ulrich Schwan, Salem - Beuren, Germany

[21] Appl. No.: 578,567
[22] PCT Filed: Apr. 12, 1995
[86] PCT No.: PCT/EP95/01374
  § 371 Date: Feb. 15, 1996
  § 102(e) Date: Feb. 15, 1996
[87] PCT Pub. No.: WO95/28775
  PCT Pub. Date: Oct. 26, 1995

[30] Foreign Application Priority Data

Apr. 17, 1994 [DE] Germany ............ 44 12 958.0

[51] Int. Cl.$^6$ ............... H04B 3/60; H01P 1/06
[52] U.S. Cl. ............ 333/24 R; 333/32; 333/24 C; 333/256; 333/261; 455/41
[58] Field of Search ............... 333/24 R, 24 C, 333/32, 261, 109, 111, 256; 455/41, 66

[56] References Cited

U.S. PATENT DOCUMENTS

| | | | |
|---|---|---|---|
| 3,505,615 | 4/1970 | Simons | 333/24 R |
| 3,949,169 | 4/1976 | Braeckelmann | 333/109 X |
| 4,054,850 | 10/1977 | Gerrish | 333/24 R |
| 4,700,152 | 10/1987 | Wilson | 333/24 C |
| 5,140,696 | 8/1992 | Fox | 455/41 |
| 5,157,393 | 10/1992 | Fox et al. | 340/870.3 |
| 5,432,486 | 7/1995 | Wong | 333/24 R X |
| 5,577,026 | 11/1996 | Gordon et al. | 370/24 |

FOREIGN PATENT DOCUMENTS

| | | | |
|---|---|---|---|
| 66246 | 1/1948 | Denmark | 333/24 C |
| 4006007 | 8/1990 | Germany | 455/41 |
| 4005770 | 11/1990 | Germany | 340/870 |
| 0220401 | 9/1988 | Japan | 333/261 |
| 1156315 | 6/1969 | United Kingdom . | |
| 2106357 | 4/1983 | United Kingdom | 455/55 |

*Primary Examiner*—Robert Pascal
*Assistant Examiner*—Barbara Summons
*Attorney, Agent, or Firm*—Robert W. Becker & Associates

[57] ABSTRACT

A data transmission device has a first module and a second module moveable relative to one another. One of the modules functions as a sending module and the other functions as a receiving module for transmitting data between first and second modules. One of the modules is an electrical line with a defined surge impedance and the other module is a coupling probe for coupling contact-free with the electrical line. A first sending and receiving electronic circuit is connected to the first module. A second sending and receiving electronic circuit is connected to the second module.

30 Claims, 5 Drawing Sheets

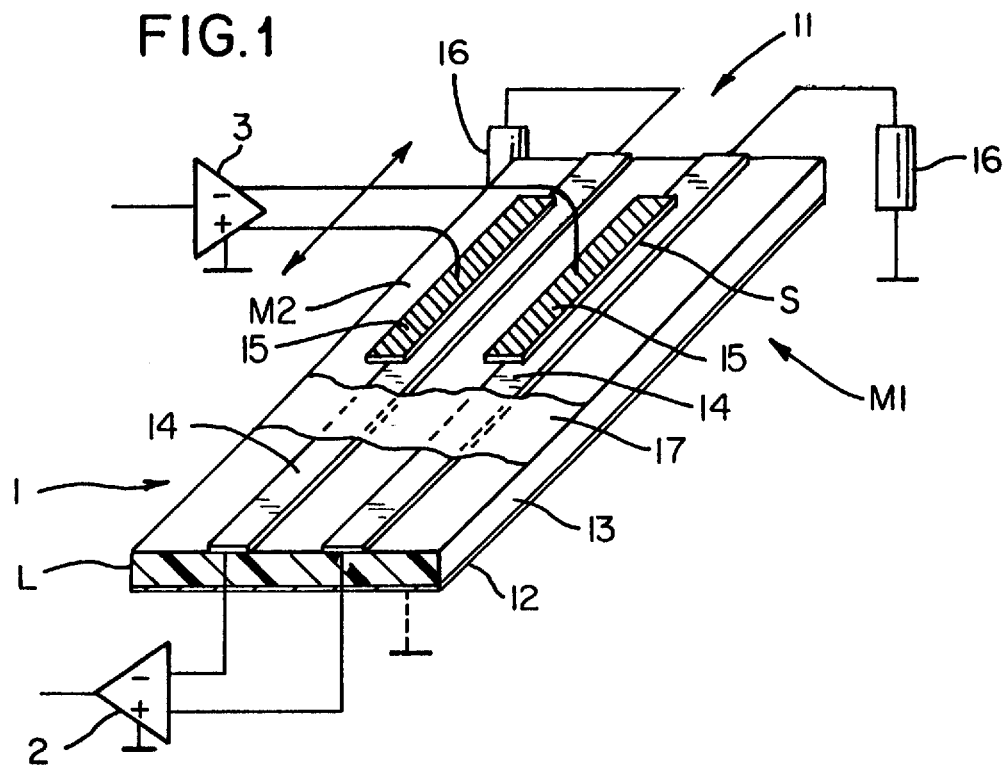
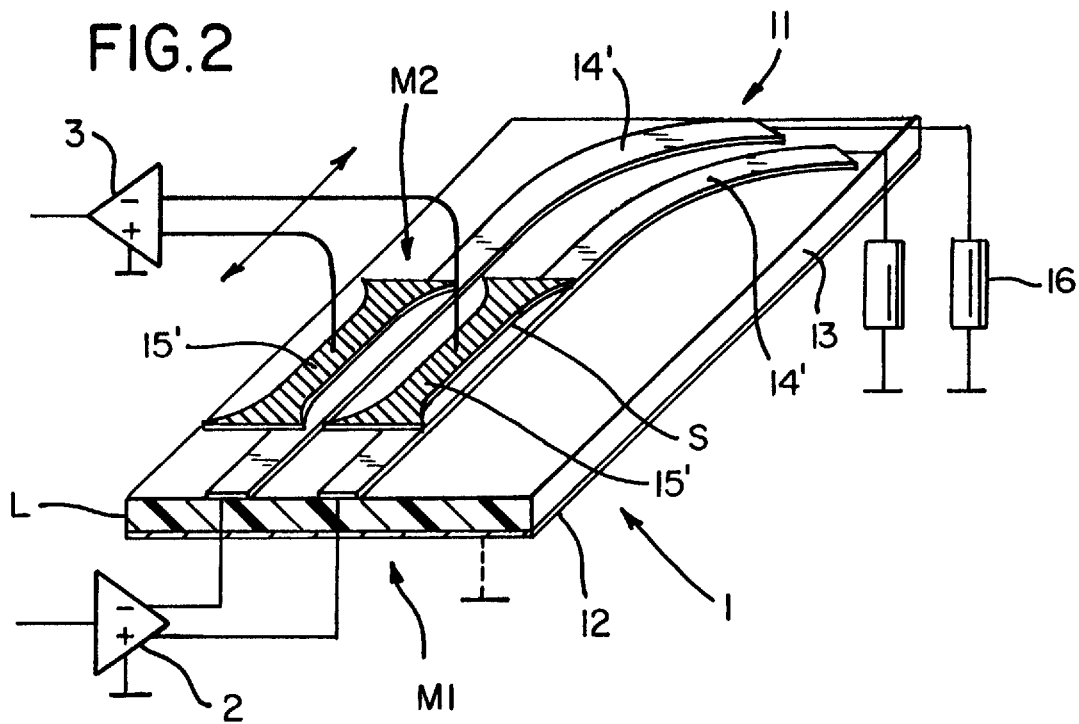

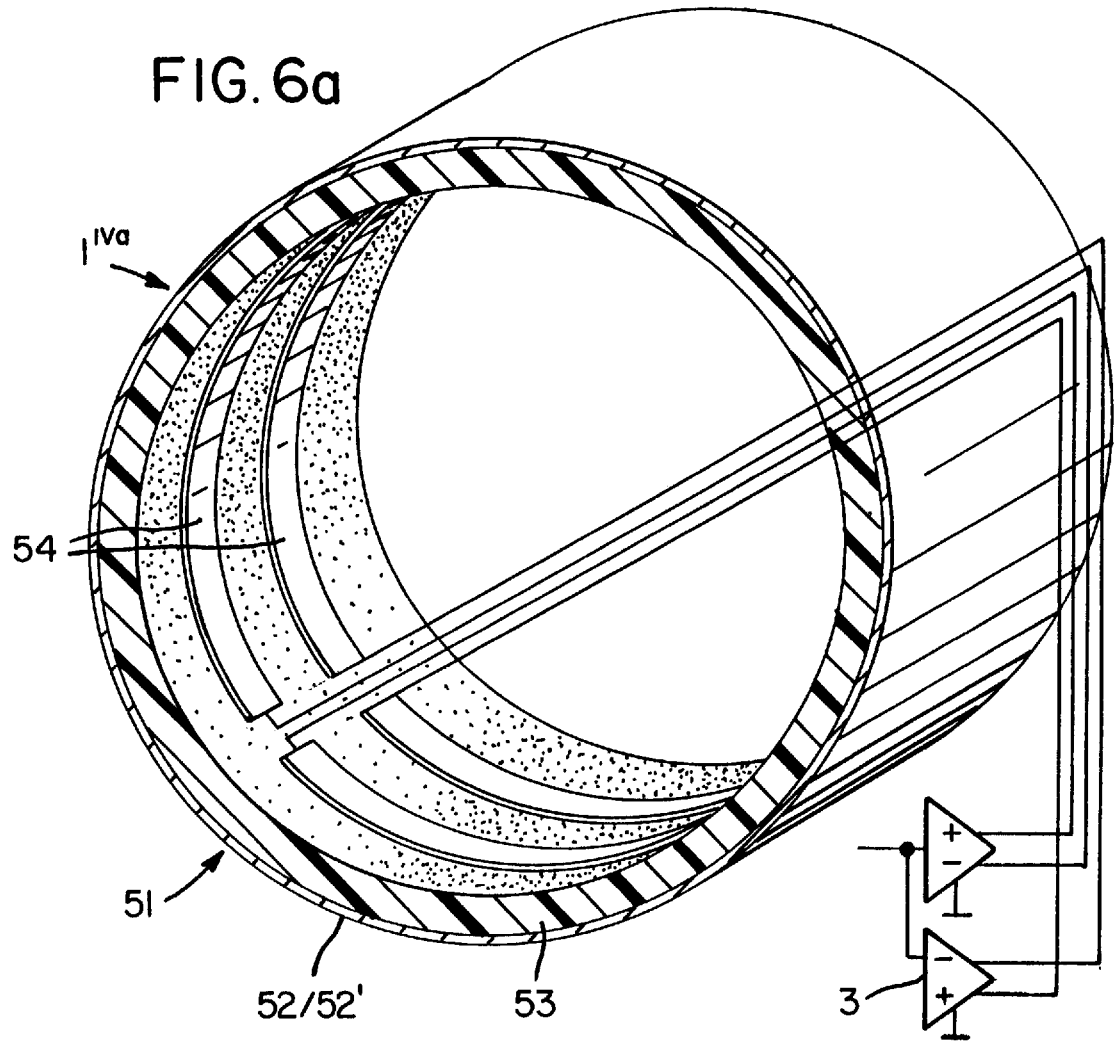

DATA TRANSMISSION DEVICE

BACKGROUND OF THE INVENTION

The invention relates to a device for transmitting data between a sending module and a receiving module which are moveable relative to one another. From DE-A1-40 06 770 a communication device of this kind for transmitting data between a sending platform and a receiving platform, which are movable relative to one another, is known. On the stationary sending platform a sending antenna is provided which has two identical lengths of a strip line arranged in a circle. Furthermore, a receiving antenna is provided on the receiving platform which is arranged at a predetermined distance from the sending antenna and which is movable about it.

In this communication system a data transmittal is thus only possible from the sending antenna to the receiving antenna and thus only in one direction. Furthermore, due to the circular arrangement of the sending antenna the field of application is further limited. However, it is a particular disadvantage that only a small portion of the transmittal power emitted by the sending antenna reaches the receiving antenna and that due to transmission in a circle about the sending antenna a perturbing radiation must be accepted with which machinery and devices arranged in the vicinity are unfavorably affected.

It is therefore an object of the invention to provide a device for transmitting data of the aforementioned kind with which data can be transmitted not only in both directions alternatingly, but which also allows for any desired arrangement of the sending, respectively, receiving antenna as a track conductor so that extremely versatile application possibilities are provided. Furthermore, the device should be simple in its construction, and thus economical to produce, and not susceptible to soiling. Especially, a broad-band coupling with minimal damping between the sender and the receiver should be possible, and this substantially without loss of radiation.

SUMMARY OF THE INVENTION

According to the invention this is achieved in a device for transmitting data such that one of the modules is an electric conductor with a defined surge impedance and the other module is a probe that is coupled in a contact-free manner thereto and that both modules are connected to sending and receiving electronic circuits.

The data transmission device according to the present invention is thus primarily characterized by:

a first module and a second module moveable relative to one another, wherein one of the first and second modules functions as a sending module and the other functions as a receiving module for transmitting data between the first and second modules;

one of the first and the second modules being an electrical line with a defined surge impedance and the other of the first and second modules being a coupling probe for coupling contact-free with the electrical line;

a first sending and receiving electronic circuit connected to the first module; and a second sending and receiving electronic circuit connected to the second module.

Preferably, the electrical line is a stationary track line and the coupling probe is moveable along the track line in a longitudinal direction of the track line.

Advantageously, the first and the second modules function alternatingly as a receiving module and a sending module.

Expediently, the electrical line is a stripline comprised of an electrically conducting base member, an insulating layer, and at least one electrical lead fastened to the insulating layer.

The stripline may be a plane plate.

In a preferred embodiment of the present invention, the coupling probe is at least one moveable coupling plate covering at least partly the electrical lead of the electrical line, the coupling plate being a plane plate or a curved plate.

In yet another embodiment, the electrical lead of the stripline is comprised of two substantially semi-circular sections of identical length positioned mirror-symmetrical to one another.

Preferably, free ends of the semi-circular sections are spaced at a distance from one another and the coupling plate has a functional length cooperating with the stripline which functional length is longer than the distance between the free ends of the semi-circular sections.

The stripline expediently comprises a plurality of the electrical leads arranged concentrically to one another.

The electrical lead can have a circular configuration and may be comprised of at least two sections arranged so as to describe a circle.

Preferably, a plurality of the electrical leads is provided which are arranged concentrically to one another.

The inventive device may further comprise a device for transmitting electrical energy.

The base member is a hollow profiled member and the device for transmitting electrical energy comprises a means for transmitting positioned within the hollow profiled member. The means for transmitting is selected from the group consisting of a coil and a coupling loop.

The hollow profiled member has two oppositely arranged outer surfaces, and the insulating layer is applied to the oppositely arranged outer surfaces, wherein to the insulating layer on each one of the outer surfaces at least one of the electrical leads is connected, wherein the coupling probe comprises moveable coupling plates cooperating with the electrical leads.

In a preferred embodiment of the present invention, the base member is comprised of a closed tube. The insulating layer is applied to the inner mantle surface of the closed tube, with the at least one electrical lead being connected to the insulating layer.

The base member may be comprised of a closed tube. The insulating layer is applied to the outer mantle surface of the closed tube, with the at least one electrical lead connected to the insulating layer.

Advantageously, the electrical line on a side facing the coupling probe is provided with a protective cover, and the coupling probe on a side facing the electrical line is provided with a protective cover.

Expediently, the electrical line is a coaxial line.

For achieving capacitive coupling of the coaxial line with the coupling probe, the coaxial line comprises an outer lead and an inner lead, wherein the outer lead is an axially slotted tube and wherein the inner lead is a profiled member having a circular cross-section. The profiled member is concentrically positioned in the axially slotted tube. The coaxial line further comprises a radial stay, consisting of an insulating material, connected between the axially slotted tube and the profiled member.

In another embodiment, the coupling probe is comprised of two mechanically coupled, coaxially arranged tubular sections, wherein the inner one of the tubular sections surrounds the inner lead with radial spacing and wherein the outer one of the tubular sections is positioned at the inner side of the outer lead with radial spacing.

For achieving inductive coupling of the coaxial line with the coupling probe, the coaxial line comprises an outer lead and an inner lead, wherein the outer lead is an axially slotted tube and wherein the inner lead is a profiled member having a circular cross-section. The profiled member is concentrically positioned in the axially slotted tube so as to be spaced from the axially slotted tube.

The coupling probe may be an annulus transformer having a secondary coil, the annulus transformer surrounding the inner lead.

The electrical line may be a two-wire line.

For impedance adjustment, the electrical line comprises at least at one end thereof a terminating resistor having a resistance identical to the surge impedance of the electrical line.

In yet another embodiment of the invention, two of the electrical lines are provided and each one of the electrical lines has one of the coupling probes coordinated therewith. The electrical lines form a constructive unit and the coupling probes form a constructive unit. The sending and receiving electronic circuits are push-pull circuits.

It is expedient that the electric line with defined surge impedance is a stationarily arranged track line, the probe is to be embodied so as to be movable relative thereto in the longitudinal direction, and the coupling and decoupling of the two modules is designed so as to be interchangeable.

The electric line with defined surge impedance in a simple manner can be embodied as a stripline, comprised of an electrically conducting base plate, an insulation layer, and an electrical lead, as a coaxial line or as a two-wire line. The stripline can be embodied as a plane plate. However, for capacitive coupling the electrical line with defined surge impedance in the form of a coaxial line with the probe, it is also possible to provide the outer lead of the coaxial line in the form of a tube slotted in the longitudinal direction in which tube the inner lead is arranged centrally via a stay, comprised of an electrically insulating material and connected to the tube, whereby the inner lead is preferably in the form of a profiled member having a circular cross-section. The probe should be comprised of two mechanically connected tube sections, of which the inner tube section surrounds with radial distance the inner lead at its unobstructed area and the outer tube section is arranged at the inner side of the outer lead with radial distance to it.

For inductively coupling the electrical line with defined surge impedance in the form of a coaxial line with the probe, according to a further embodiment the coaxial line can be comprised of a tube slotted in the longitudinal direction as the outer lead and a profiled member with preferably circular cross-section, centrally arranged with spacing to the tube, as the inner lead. The probe can be in the form of an annulus transformer which comprises a secondary coil and surrounds the lead.

It is furthermore advantageous to provide, preferably at both ends, the electrical line with defined surge impedance with terminal resistors having the same resistance as the surge impedance for the purpose of impedance adjustment.

Expediently, the probe is a movable coupling plate which is plane or curved and which covers completely or partially the lead of the electrical line with defined surge impedance.

More over, a plurality, preferably two, electrical lines with defined surge impedance and probes coordinated therewith should form a constructive unit and should be connected respectively to a push-pull sender and push-pull receiver functioning as the sending and receiving electronic circuits.

According to another embodiment the lead of the strip line can be comprised of two sections of identical length, which are substantially semi-circular and arranged opposite to one another, whereby the coupling plate which forms the probe is sized longer in the area cooperating with the lead of the stripline than the distance between the two sections of the lead and wherein respectively two or more sections of two or more leads of the stripline can be concentrically arranged relative to one another.

The stripline, however, may also be comprised of a closed tube as the base plate, an insulating layer applied to its outer or inner mantle surface, and one or more leads encircling the tube so as to be laterally spaced from one another.

It is further more expedient to cover the electrical line with defined surge impedance and/or the probe on the surfaces facing one another with a protective foil, a sleeve etc.

The inventive data transmission device may have associated therewith a device for transmitting electrical energy and may form therewith a constructive unit.

This, for example, can be achieved such that the base plate of the stripline is a hollow profile, preferably in the form of a running track, in which a coupling loop, a coil etc. is arranged for transmitting electrical energy. Furthermore, on two oppositely arranged outer surfaces of the hollow profile an isolating layer may be provided as well as one or more electrical leads applied thereto which cooperate with the movable probes.

When a device for transmitting data is designed according to the invention, it is possible in a very simple manner to transmit data alternatingly in both directions and to embody the electrical lines with defined surge impedance in any desired manner as a track line so that the device can be employed in various ways. The probe is coupled without contact with the electrical line having defined surge impedance; the probe can thus be moved at high velocity and without wear within the area of the track line.

Due to the inventive embodiment a signal transmission device is thus provided which is not susceptible to soiling, provides for a travel path of any desired shape, and allows for a broad-band coupling with minimal damping between sender and receiver without radiation loss. Preferably, this device is thus suitable for robots, machine tools, transporting devices, cranes, conveying devices, elevators, and similar devices in which during a displacement movement data transmission is needed. With minimal construction a substantially disturbance- and loss-free, especially radiation-free, data transmission is thus possible alternatingly in both directions along the respective movement range of the probe. Since the probe comprises a minimal mass, it can be moved at high velocities and acceleration.

BRIEF DESCRIPTION OF THE DRAWINGS

In the drawing some embodiments of the device according to the invention for transmitting data are represented which will be explained in the following in detail. It is shown, in schematic representation, in:

FIG. 1 the device with a stripline as an electrical line having defined surge impedance, which is embodied as a track line and which has coordinated therewith a movable probe;

FIG. 2 the device according to FIG. 1 in another embodiment;

FIG. 6a shows a device with a cylindrically embodied track line having insulation and leads on the inside;

DESCRIPTION OF PREFERRED EMBODIMENTS

Figure 3:
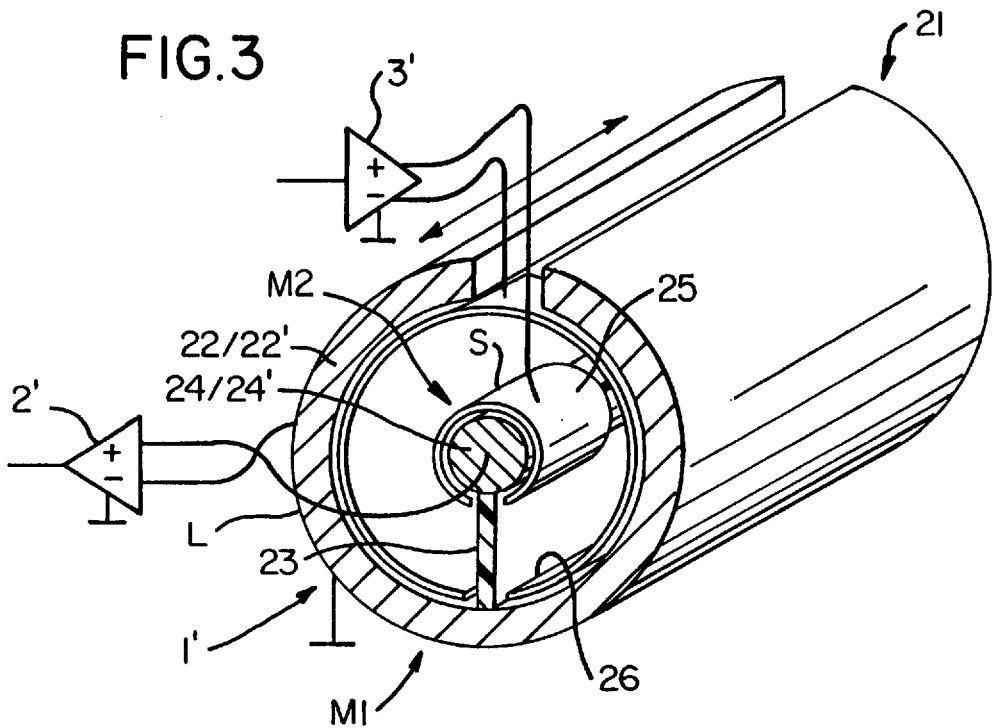
FIG. 3 the device with a coaxial line for capacitive coupling with the corresponding probe.

The devices in various embodiments represented in FIGS. 1 through 7 in different embodiments and identified by reference numerals 1, 1', 1", 1''' and 1$_{IV}$ serve to transmit data alternatingly between a sending module $M_1$ and a receiving module $M_2$ which are movable relative to one another. One of the modules is respectively embodied as an electrical line L having a defined surge impedance, the other module is comprised of a probe S which is coupled in a contact-free manner with the electrical line L having defined surge impedance. The two modules $M_1$ and $M_2$ are connected to sending electronic circuits to which data to be transmitted are fed and connected to receiving electronic circuits by which the data are received.

In the embodiment according to FIGS. 1 and 2 the electrical line L is a stripline 11 in the form of a plane track line which is comprised of an electrically conducting base plate 12, an insulating layer 13 applied thereto as well as two electrical leads 14, 14' arranged thereon. The respective probe S is formed by coupling plates 15, 15'. In the embodiment according to FIG. 2 the two leads 14' are partly curved, and the coupling plates 15' are designed in a special manner such that upon passing along the curve the capacitive coupling is always insured. For adjusting the impedance, the leads 14, 14' are each provided with terminating resistors 16. Furthermore, the stripline 11 as is shown partially in FIG. 1, can be covered by a protective cover 17, for example, in the form of a foil.

With this embodiment it is possible to transmit over the entire range of the leads 14, 14' data between the two modules $M_1$ and $M_2$ without radiation loss, which would result in interference with other devices, and without greater power losses.

In the device 1' according to FIG. 3, a coaxial line 21 is provided for the capacitive coupling of line L having defined surge impedance as module $M_1$ and the probe S as module $M_2$. The coaxial line 21 is comprised of an outer lead 22 and an inner lead 24. The outer lead 22 is embodied as a tube 22' slotted in the longitudinal direction within which via a stay 23, made of insulating material, the inner lead 24, which is in the form of a member 24', is centrally arranged.

The probe S is comprised of two tubular sections 25 and 26. The inner tubular section 25 surrounds the inner lead 24 in its unobstructed area with radial spacing, and the tubular section 26 which is mechanically connected to the inner tubular section 25 is positioned at the inner side of the outer lead 22 in its unobstructed area with radial spacing. The two tubular sections 25 and 26 of the probe S are connected to sending electronic circuit 3', and the inner lead 24 and the outer lead 22 are connected to the receiving electronic 2'.

Figure 4:
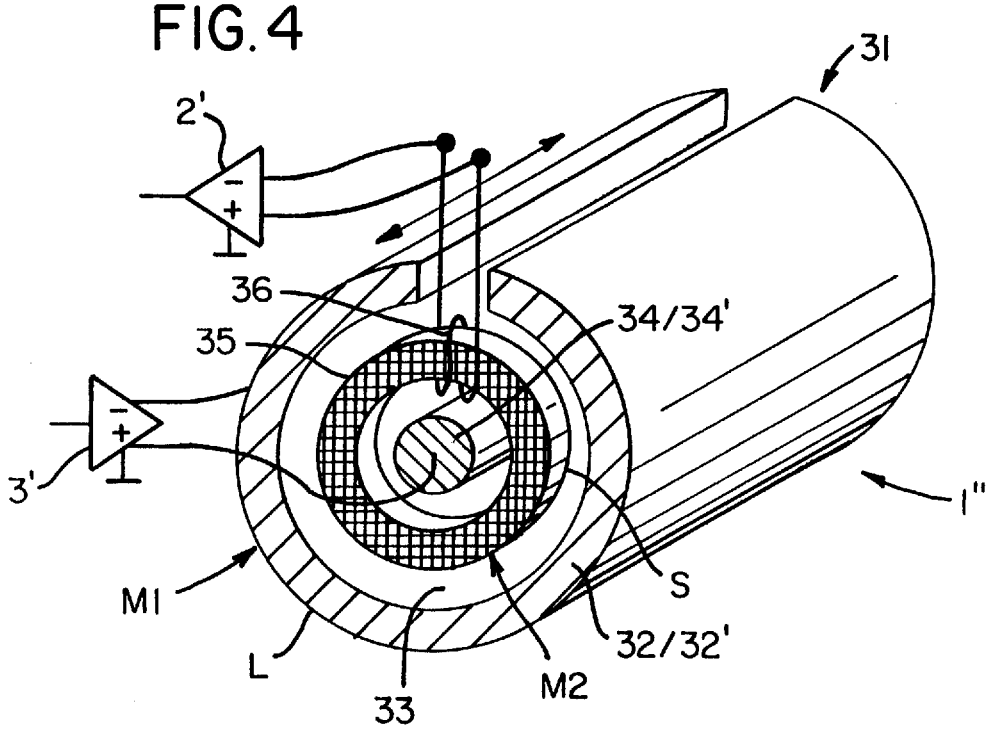
FIG. 4 a device with coaxial line for inductive coupling with the coordinated probe.

In FIG. 4 it is shown how an inductive coupling of the modules $M_1$ and $M_2$ can be achieved with the device 1". The line L with defined surge impedance, which represents the module $M_1$, is comprised of a coaxial line 31, the module $M_2$ and thus the probe S is in the form of a transformer 35 provided with a secondary coil 36 which is arranged within the slotted tube 32' of the outer lead 32. The inner lead 34, which is comprised of a profiled member 34' made of solid material, is electrically separated with an air gap 33 from the outer lead 32. The primary coil of the transformer 35 is formed by the inner lead 34 and the outer lead 32 connected thereto via a terminating resistor.

By moving the probe S in the form of the transformer 35, it is also possible at any desired location of the line L in the form of the track line to transmit data alternatingly in both directions between module $M_1$ and module $M_2$ which are connected to the electronic circuits 2' and 3'.

Figure 5:
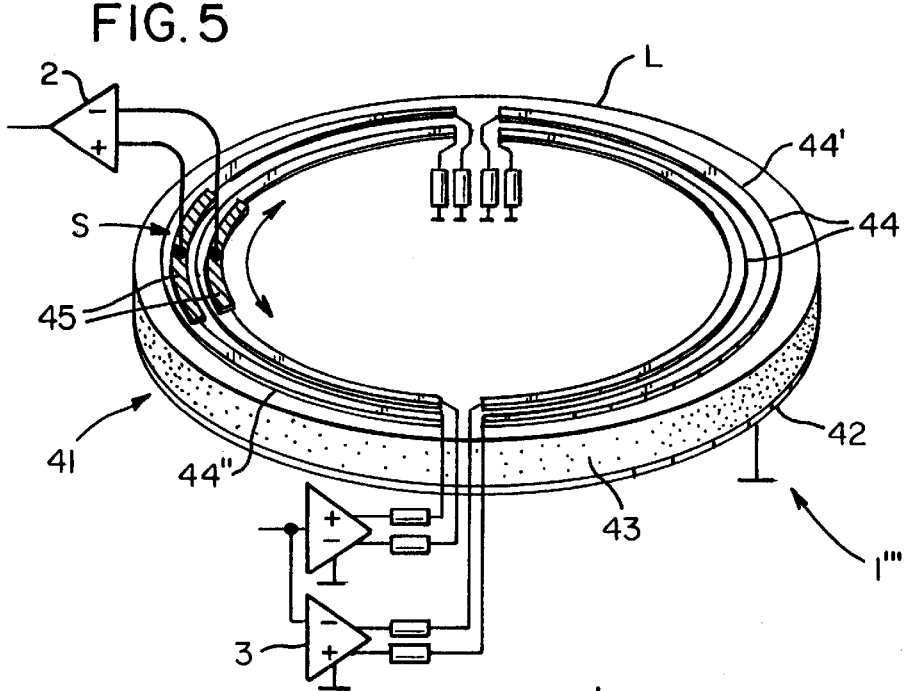
FIG. 5 a device according to FIG. 1 with a track line of a circular design.

According to FIG. 5, the lead 44 of the stripline 41 of the device 1''' is comprised of two sections 44' and 44" of identical length and substantially semi-circular shape which are positioned opposite one another. The electrically conducting base plate 42 as well as the insulating layer 43, on which two concentrically arranged leads 44 are provided, is embodied in the form of a circular disc.

The coupling plates 45 which form the probes S can thus move along the circular path. Since the coupling plates 45 are longer than the distance between the two coordinated sections 44' and 44" of a lead 44, it is ensured that even when passing the location of separation a data transmittal is possible between the line L having a defined surge impedance and the probes S that are connected via non-represented resistors with the same resistance as the surge impedance to the electronic circuits 2 and 3.

Figure 6:
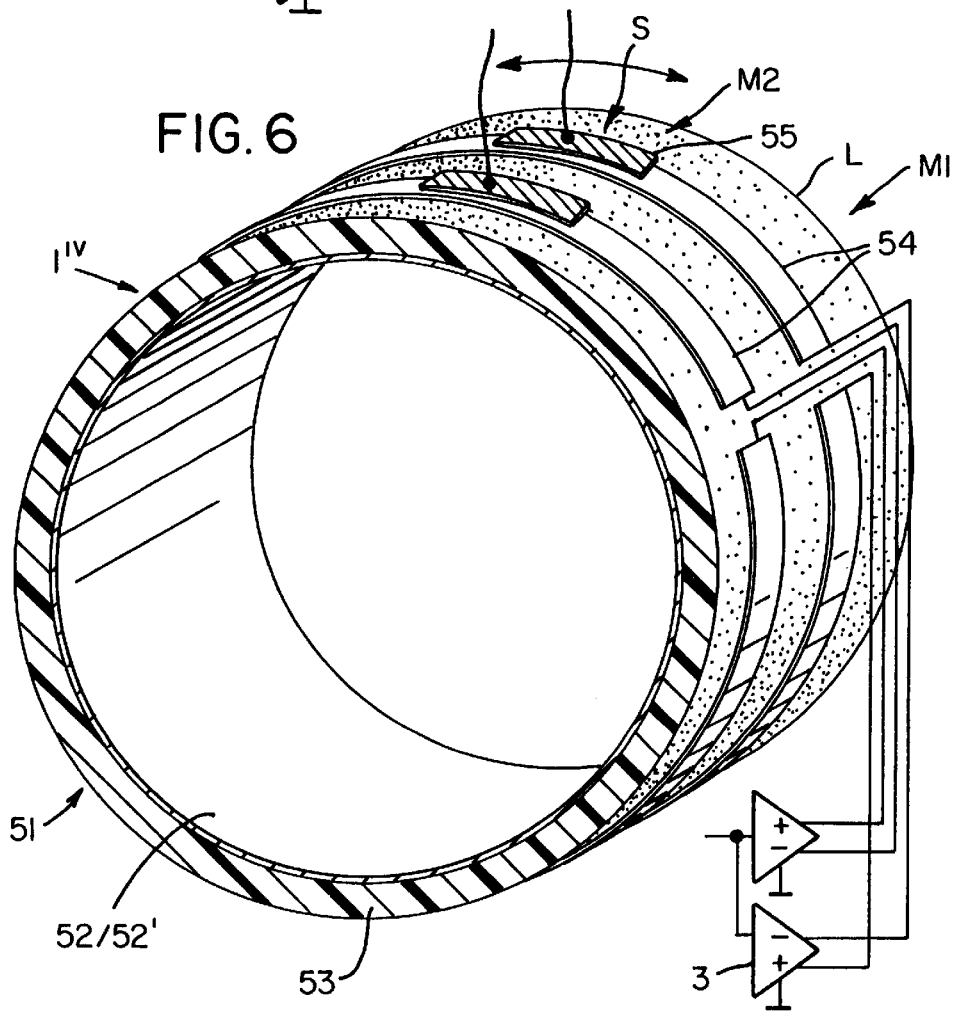
FIG. 6 a device according to FIG. 1 with a cylindrically embodied track line.

In the embodiment of the device $1^{IV}$ according to FIG. 6, the stripline 51 is comprised of a tube 52' forming the base plate 52 on the outer mantle surface of which an insulating layer 53 is provided to which two leads 54 are connected. For the transmission of data the curved coupling plates 55 representing the probes S as module $M_2$ are to be guided along the line L which represents the module $M_1$.

Figure 7:
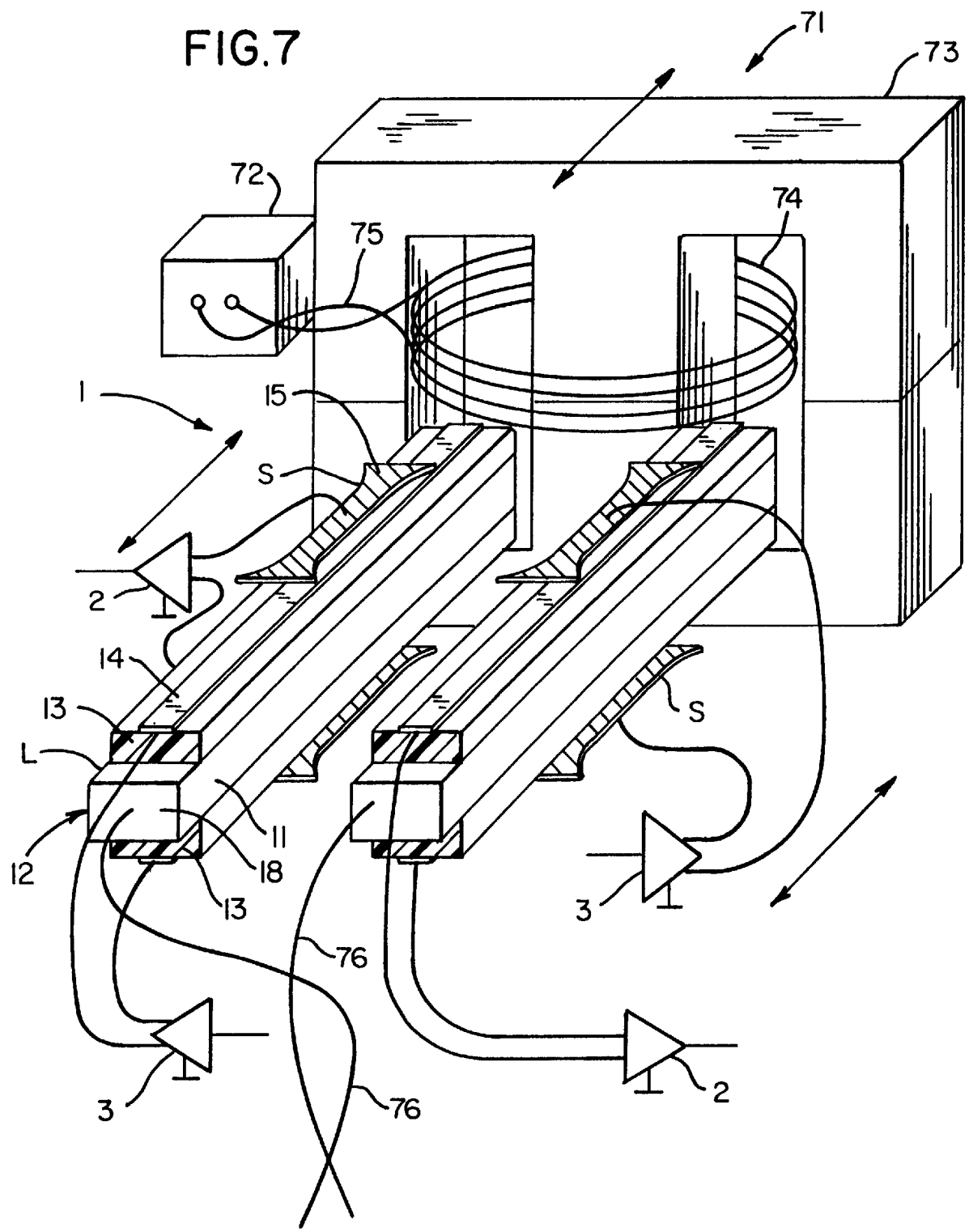
FIG. 7 a device according to FIG. 1 in a further embodiment having associated therewith a device for transmitting electrical energy.

In FIG. 7 the device 1 for transmitting data has coordinated therewith a device 71 for transmitting electrical energy. The device 71 is comprised of a transformer 73, the secondary coil 74 of which is connected via line 75 with a consumer 72 that is also movable. The primary coil 76 is in the form of a coupling loop which is arranged in the hollow profiled member 18 that form the base plate 12 of the stripline 11.

Furthermore, on two oppositely arranged outer surfaces of the hollow profiled member 18 an isolating layer 13 is provided to which a lead 14 is connected and with which the movable coupling plates 15 as probes S are cooperating. A multitude of applications of the embodiment of FIG. 7 for transmitting data and/or electrical energy onto moved devices is thus possible.

The present invention is, of course, in no way restricted to the specific disclosure of the specification and drawings, but also encompasses any modifications within the scope of the appended claims.

What we claim is:

1. A data transmission device comprising:

a first module and a second module movable to one another, wherein one of said first and said second modules functions as a sending module and the other functions as a receiving module for transmitting data between said first and second modules;

one of said first and said second modules an electrical line with a defined surge impedance and the other of said first and second modules being a coupling probe for coupling contact-free with said electrical line;

a first sending and receiving electronic circuit connected to said first module; and a second sending and receiving electronic circuit connected to said second module;

wherein said electrical line is a stripline comprised of an electrically conducting base member, an insulating layer, and at least one electrical lead fastened to said insulating layer;

a device for transmitting electrical energy;

said base member is a hollow profiled member and wherein said device for transmitting electrical energy comprises a means for transmitting positioned within said hollow profiled member; and wherein said hollow profiled member has two oppositely arranged outer surfaces and wherein said insulating layer is applied to said oppositely arranged outer surfaces, wherein to said insulating layer on each one of said outer surfaces at least one of said electrical leads is connected, wherein said coupling probe comprises moveable coupling plates cooperating with said electrical leads.

2. A data transmission device according to claim 1, wherein said electrical line is a stationary track line and wherein said coupling probe is moveable along said track line in a longitudinal direction of said track line.

3. A data transmission device according to claim 1, wherein said stripline is a plane plate.

4. A data transmission device according to claim 1, wherein said coupling probe is at least one moveable coupling plate covering at least partly a respective said at least one electrical lead of said electrical line, said at least one coupling plate having a shape selected from the group consisting of a plane plate and a curved plate.

5. A data transmission device according to claim 1, wherein each of said at least one electrical leads of said stripline is comprised of two substantially semi-circular sections of identical length positioned mirror-symmetrical to one another.

6. A data transmission device according to claim 5, wherein free ends of said semi-circular sections are spaced at a distance from one another and wherein said at least one coupling plate has a functional length cooperating with said stripline which functional length is longer than said distance between said free ends of said semi-circular sections.

7. A data transmission device according to claim 1, wherein said means for transmitting is selected from the group consisting of a coil and a coupling loop.

8. A data transmission device according to claim 1, wherein said electrical line on a side facing said coupling probe is provided with a protective cover.

9. A data transmission device according to claim 1, wherein said coupling probe on a side facing said electrical line is provided with a protective cover.

10. A data transmission device according to claim 1, wherein said electrical line is a two-wire line.

11. A data transmission device according to claim 1, wherein, for impedance adjustment, said electrical line comprises at least at one end thereof a terminating resistor having a resistance identical to said surge impedance of said electrical line.

12. A data transmission device according to claim 1, wherein said coupling probe is at least one moveable coupling plate covering at least partly said electrical lead of said electrical line, said coupling plate having a shape selected from the group consisting of a plane plate and a curved plate.

13. A data transmission device according to claim 1, wherein said first and said second modules function alternatingly as a receiving module and a sending module.

14. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second module being a coupling probe for coupling contact-free with said electrical line;

a first sending and receiving electronic circuit connected to said first module; and a second sending and receiving electronic circuit connected to said second module;

wherein said electrical line is a coaxial line.

15. A data transmission device according to claim 14, wherein, for achieving capacitive coupling of said coaxial line with said coupling probe, said coaxial line comprises an outer lead and an inner lead, wherein said outer lead is an axially slotted tube and wherein said inner lead is a member having a circular cross-section, wherein said member is concentrically positioned in said axially slotted tube, said coaxial line further comprising a radial stay, consisting of an insulating material, connected between said axially slotted tube and said member.

16. A data transmission device according to claim 15, wherein said coupling probe is comprised of two mechanically coupled, coaxially arranged tubular sections, wherein the inner one of said tubular sections surrounds said inner lead with radial spacing and wherein the outer one of said tubular sections is positioned at the inner side of said outer lead with radial spacing.

17. A data transmission device according to claim 14, wherein, for achieving inductive coupling of said coaxial line with said coupling probe, said coaxial line comprises an outer lead and an inner lead, wherein said outer lead is an axially slotted tube and wherein said inner lead is a profiled member having a circular cross-section, wherein said profiled member is concentrically positioned in said axially slotted tube so as to be spaced from said axially slotted tube.

18. A data transmission device according to claim 17, wherein said coupling probe is an annulus transformer having a secondary coil, said annulus transformer surrounding said inner lead.

19. A data transmission device according to claim 14, wherein said coupling probe is at least one moveable coupling plate covering at least partly said electrical lead of said electrical line, said coupling plate having a shape selected from the group consisting of a plane plate and a curved plate.

20. A data transmission device according to claim 14, wherein said first and said second modules function alternatingly as a receiving module and a sending module.

21. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second modules being a coupling probe for coupling contact-free with said electrical line;

a first sending and receiving electronic circuit connected to said first module; and a second sending and receiving electronic circuit connected to said second module;

wherein said electrical line is a stripline comprised of an electrically conducting base member, an insulating layer, and at least one electrical lead fastened to said insulating layer;

wherein said coupling probe is at least one moveable coupling plate covering at least partly said electrical lead of said electrical line, said coupling plate having a shape selected from the group consisting of a plane plate and a curved plate;

wherein said electrical lead of said stripline is comprised of two substantially semi-circular sections of identical length positioned mirror-symmetrical to one another; and wherein said stripline comprises a plurality of said electrical leads arranged concentrically to one another.

22. A data transmission device according to claim 21, wherein said first and said second modules function alternatingly as a receiving module and a sending module.

23. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second modules being a coupling probe for coupling, contact-free with said electrical line;

a first sending and receiving electronic circuit connected to said first module; and a second sending and receiving electronic circuit connected to said second module;

wherein said electrical line is a stripline comprised of an electrically conducting base member, an insulating layer, and at least one electrical lead fastened to said insulating layer;

wherein said coupling probe is at least one moveable coupling plate covering at least partly said electrical lead of said electrical line, said coupling plate having a shape selected from the group consisting of a plane plate and a curved plate;

wherein said electrical lead has a circular configuration and is comprised of at least two sections arranged so as to describe a circle; and wherein a plurality of said electrical leads is provided which are arranged concentrically to one another.

24. A data transmission device according to claim 23, wherein said first and said second modules function alternatingly as a receiving module and a sending module.

25. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second modules being a coupling probe for coupling contact-free with said electrical line;

a first sending and receiving electronic circuit connected to said first module; and a second sending and receiving electronic circuit connected to said second module;

wherein said electrical line is a stripline comprised of an electrically conducting base member, an insulating layer, and at least one electrical lead fastened to said insulating layer;

wherein said base member is comprised of a closed tube;

said insulting layer is applied to the inner mantle surface of said closed tube, with said at least one electrical lead connected to said insulating layer.

26. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second modules being a coupling probe for coupling contact-free with said electrical line;

a first sending and receiving electronic circuit connected to said first module; and a second sending and receiving electronic circuit connected to said second module;

wherein said electrical line is a stripline comprised of an electrically conducting base member, an insulating layer, and at least one electrical lead fastened to said insulating layer;

wherein said base member is comprised of a closed tube and said insulating layer is applied to the outer mantle surface of said closed tube, with said at least one electrical lead connected to said insulating layer.

27. A data transmission device according to claim 26, wherein said coupling probe is at least one moveable coupling plate covering at least partly said electrical lead of said electrical line, said coupling plate having a shape selected from the group consisting of a plane plate and a curved plate.

28. A data transmission device according to claim 26, wherein said first and said second modules function alternatingly as a receiving module and a sending module.

29. A data transmission device comprising:

a first module and a second module moveable relative to one another, wherein one of said first and said second modules functions as a sending module and the other functions as a receiving module for transmitting data between said first and second modules;

one of said first and said second modules being an electrical line with a defined surge impedance and the other of said first and second modules being a coupling probe for coupling contact-free with said electrical line;

a first sending and receiving electronic circuit connected to said first module; and a second sending and receiving electronic circuit connected to said second module;

wherein two of said electrical lines are provided and each one of said electrical lines has one of said coupling probes coordinated therewith, wherein said electrical lines form a constructive unit, wherein said coupling probes form a constructive unit, and wherein said sending and receiving electronic circuits are push-pull circuits.

30. A data transmission device according to claim 29, wherein said first and said second modules function alternatingly as a receiving module and a sending module.

* * * * *